United States Patent
Kim et al.

(10) Patent No.: US 7,933,973 B2
(45) Date of Patent: Apr. 26, 2011

(54) OBJE NETWORK DEVICE SERVICE APPARATUS AND METHOD IN UPNP NETWORK SYSTEM

(75) Inventors: Jun Hyeong Kim, Yongin-si (KR); Sang Do Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 11/723,291

(22) Filed: Mar. 19, 2007

(65) Prior Publication Data

US 2008/0104253 A1    May 1, 2008

(30) Foreign Application Priority Data

Oct. 31, 2006    (KR) .................. 10-2006-0106814

(51) Int. Cl.
*G06F 15/16* (2006.01)
(52) U.S. Cl. ........................... 709/219; 709/208
(58) Field of Classification Search .................. 709/219
See application file for complete search history.

(56) References Cited

U.S. PATENT DOCUMENTS

| | | | | |
|---|---|---|---|---|
| 6,779,004 B1* | 8/2004 | Zintel | | 709/227 |
| 7,085,814 B1* | 8/2006 | Gandhi et al. | | 709/208 |
| 7,454,542 B2* | 11/2008 | Illowsky et al. | | 710/62 |
| 7,613,881 B2* | 11/2009 | Illowsky et al. | | 711/117 |
| 7,788,663 B2* | 8/2010 | Illowsky et al. | | 717/177 |
| 7,809,386 B2* | 10/2010 | Stirbu | | 455/503 |
| 2002/0083143 A1* | 6/2002 | Cheng | | 709/208 |
| 2003/0016682 A1* | 1/2003 | Cho | | 370/401 |
| 2004/0246992 A1* | 12/2004 | Henry et al. | | 370/467 |
| 2005/0021714 A1* | 1/2005 | Yook et al. | | 709/223 |
| 2005/0120082 A1* | 6/2005 | Hesselink et al. | | 709/203 |
| 2007/0004436 A1* | 1/2007 | Stirbu | | 455/503 |
| 2007/0192445 A1* | 8/2007 | Lord et al. | | 709/219 |
| 2007/0250482 A1* | 10/2007 | Yao et al. | | 707/3 |
| 2008/0205419 A1* | 8/2008 | Shin et al. | | 370/401 |
| 2010/0165947 A1* | 7/2010 | Taniuchi et al. | | 370/331 |

FOREIGN PATENT DOCUMENTS

| | | |
|---|---|---|
| KR | 10-2002-035644 A | 5/2002 |
| KR | 10-2003-062732 A | 7/2003 |
| KR | 10-2003-071290 A | 9/2003 |
| KR | 10-2003-082903 A | 10/2003 |
| KR | 10-2004-048525 A | 6/2004 |
| KR | 10-2005-078544 A | 8/2005 |

OTHER PUBLICATIONS

W. Keith Edwards et al, An Extensible Set-Top Box Platform for Home Media Applications, IEEE ,"Transactions on Consumer Electronics", vol. 51, No. 4, Nov. 2005.*

(Continued)

*Primary Examiner* — Firmin Backer
*Assistant Examiner* — James Edwards
(74) *Attorney, Agent, or Firm* — Sughrue Mion, PLLC

(57) ABSTRACT

An Obje network device service apparatus in a Universal Plug and Play (UPnP) network system, the apparatus including: an information providing unit which discovers an Obje device, and provides information about the discovered Obje device; and an Obje service generation unit which generates a UPnP device, a counter Obje component, and an Obje client, based on the information about the Obje device, the UPnP device controlling the Obje client to use the Obje device in a UPnP control point and corresponding to the Obje device, the counter Obje component having a data type of the Obje device, and the Obje client generating a session for data transmission between the Obje device and the counter Obje component.

15 Claims, 5 Drawing Sheets

OTHER PUBLICATIONS

Edwards et al, (Edwards), IEEE, "Transactions on Consumer Electronics", vol. 51, No. 4, Nov. 2005, pp. 1175-1179.*

Edwards, IEEE, "Transactions on Consumer Electronics", vol. 51, No. 4, Nov. 2005.*

* cited by examiner

OBJE NETWORK DEVICE SERVICE APPARATUS AND METHOD IN UPNP NETWORK SYSTEM

CROSS-REFERENCE TO RELATED APPLICATION

This application claims priority from Korean Patent Application No. 10-2006-0106814, filed on Oct. 31, 2006, in the Korean Intellectual Property Office, the entire disclosure of which is incorporated herein by reference.

BACKGROUND OF THE INVENTION

1. Field of the Invention

The present invention relates to an Obje network device service, and more particularly, to an Obje network device service apparatus and method in a Universal Plug and Play (UPnP) network system which may use an Obje device in the UPnP network system.

2. Description of Related Art

With the popularization of high-speed Internet and digital home appliances, a home network, a primary form of a ubiquitous network, has been appearing.

Middleware, such as a Universal Plug and Play (UPnP) and Obje, is used to discover (e.g. detect) and control devices in a home network and provide home network services.

Obje is a type of middleware developed by the Palo Alto Research Center (PARC), and guarantees the interoperability among devices in an ad-hoc environment. Generally, a prearranged agreement regarding performance and interface of a device is required in order to guarantee the interoperability among devices. Obje reduces the prearranged agreement requirement regarding the interface, and thereby may enable the interoperability among devices. Also, Obje uses mobile codes, and thereby may alleviate deficiencies and improve performance of the devices. The mobile code includes a network protocol handler, a content handler, and a user interface.

A unit module providing services in an Obje network is called an Obje component. The Obje network comprises an Obje source component, an Obje sink component, and an Obje client. The Obje source component provides the Obje sink component with data streams and the mobile codes, which is necessary for managing the data streams. The Obje client discovers Obje components, and generates a session for data transmission between the Obje components. The Obje sink component includes a mobile code execution platform which is operated by loading the mobile codes provided by the Obje source component. Such Obje middleware may alleviate deficiencies and improve performance of the Obje component by using the mobile codes. Accordingly, the interoperability among devices may be guaranteed by only a minimal prearranged agreement.

UPnP is a type of middleware for controlling personal computer (PC)—oriented home appliances. In this instance, the PC refers to the PC generally developed by Microsoft Corporation, Intel Corporation, and the like. UPnP is based on a standard Internet protocol such as Transmission Control Protocol/Internet Protocol (TCP/IP), HyperText Transfer Protocol (HTTP), General Event Notification Architecture (GENA), Simple Object Access Protocol (SOAP), Simple Service Discovery Protocol (SSDP), extensible Markup Language (XML), and the like. Also, UPnP does not require device drivers and a use of a particular application program interface (API), and is unaffected by various types of physical network layers, operation systems, and programming languages.

A UPnP network comprises a UPnP device and a UPnP control point. The UPnP device provides services, and responds to a request of the UPnP control point. The UPnP control point discovers the UPnP device and requests the services.

In the UPnP middleware, a profile is required to be defined for each device, and devices which use a different profile may not receive and transmit messages or contents with each other. The UPnP control point obtains a description from a UPnP device, and controls a corresponding device by using information included in the description.

Conversely, in the Obje middleware, only minimal interfaces which satisfy every type of device are defined, instead of defining profiles for each device. Also, in the Obje middleware, when having a same data type, a sink component and a source component may receive and transmit contents, regardless of device type.

However, the UPnP middleware is substantially a standard of home network middleware. Also, a Digital Living Network Alliance (DLNA), an alliance of leading companies such as Microsoft Corporation, Intel Corporation, Samsung, Sony Corporation, Philips Electronics, and the like for commercializing home networks, selected the UPnP middleware as a standard middleware.

Accordingly, building a home network with only Obje devices may be practically unfeasible. Thus, an apparatus for controlling an Obje device by a UPnP control point in the home network environment including UPnP devices as well as Obje devices is required.

SUMMARY OF THE INVENTION

The present invention provides an Obje network device service apparatus and method in a Universal Plug and Play (UPnP) network system which may use an Obje device in the UPnP network system.

The present invention also provides an Obje network device service apparatus and method in a UPnP network system which generates a UPnP device corresponding to an Obje device, a counter Obje component, and an Obje client, and thereby may use the Obje device in a UPnP control point included in a UPnP network.

The present invention also provides an Obje network device service apparatus and method in a UPnP network system where a UPnP control point may use an Obje device as a UPnP device.

According to an aspect of the present invention, there is provided an Obje network device service apparatus in a Universal Plug and Play (UPnP) network system, the apparatus including: an information providing unit which discovers an Obje device, and provides information about the discovered Obje device; and an Obje service generation unit which generates a UPnP device, a counter Obje component, and an Obje client, based on the information about the Obje device, the UPnP device controlling the Obje client to use the Obje device in a UPnP control point and corresponding to the Obje device, the counter Obje component having a data type of the Obje device, and the Obje client generating a session for data transmission between the Obje device and the counter Obje component.

In this case, the Obje service generation unit includes: a UPnP device generation unit which generates the UPnP device controlling the Obje client to use the Obje device in a UPnP control point and corresponding to the Obje device; a counter Obje component generation unit which generates the counter Obje component having the data type of the Obje device; and a client generation unit which generates the data transmission between the Obje device and the counter Obje component.

In this case, the UPnP device generation unit generates the UPnP device corresponding to the Obje device in a UPnP network, and the client generation unit and the counter Obje component generation unit generates the Obje client and the counter Obje component in an Obje network, respectively.

In this case, the counter Obje component generation unit generates an Obje sink component having a data type of an Obje source component when the discovered Obje device is the Obje source component, and generates an Obje source component having a data type of an Obje sink component when the discovered Obje device is the Obje sink component.

In this case, the UPnP device controls the Obje client to generate the data transmission between the Obje device and the counter Obje component, when a control command of the UPnP control point is input to the UPnP device.

According to another aspect of the present invention, there is provided an Obje network device service method in a UPnP network system, the method including: discovering an Obje device, and providing information about the discovered Obje device; and generating a UPnP device, a counter Obje component, and an Obje client, based on the information about the Obje device, the UPnP device controlling the Obje client to use the Obje device in a UPnP control point and corresponding to the Obje device, the counter Obje component having a data type of the Obje device, and the Obje client generating a session for data transmission between the Obje device and the counter Obje component.

BRIEF DESCRIPTION OF THE DRAWINGS

The above and other aspects and advantages of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
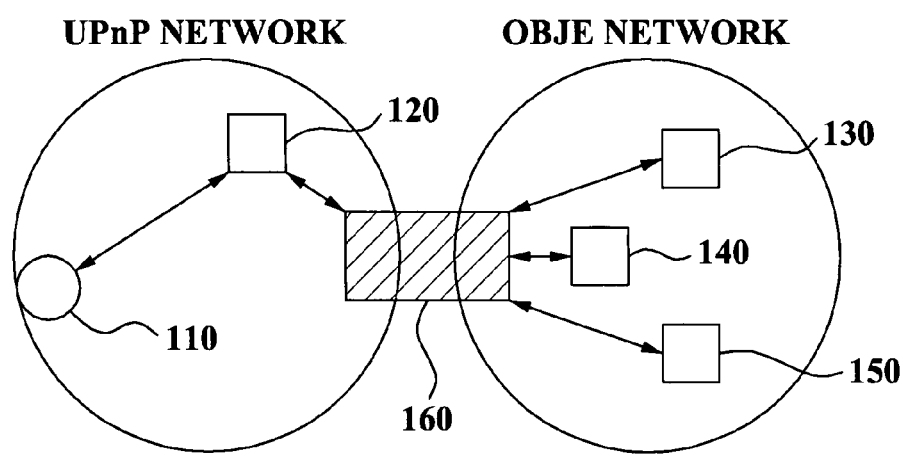
FIG. 1 is a diagram illustrating a system for an Obje network device service in a Universal Plug and Play (UPnP) network system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a system for an Obje device service in a Universal Plug and Play (UPnP) network system according to an exemplary embodiment of the present invention.

Referring to FIG. 1, the system for providing the Obje device service in the UPnP network system includes a UPnP control point 110, a UPnP device 120, an Obje device 130, an Obje client 140, a counter Obje component 150, and an Obje network device service apparatus 160.

The Obje network device service apparatus 160 discovers the Obje device 130 which exists in an Obje network, and generates the UPnP device 120, the Obje client 140, and the counter Obje component 150 to control the discovered Obje device 130 in the UPnP control point 110.

In this case, the Obje device 130 may be discovered via an Obje discovery.

In this case, the Obje network device service apparatus 160 discovers the Obje device 130. The Obje network device service apparatus 160 generates the UPnP device 120, the counter Obje component 150, and the Obje client 140, based on information about the discovered Obje device 130. Also, the UPnP device 120 may control the Obje client 140 to use the Obje device 130 by the UPnP control point 110. In this case, the UPnP device 120 corresponds to the Obje device 130, the counter Obje component 150 has a data type of the Obje device 130, and the Obje client 140 generates a session for data transmission between the Obje device 130 and the counter Obje component 150.

In this case, the UPnP device 120 corresponding to the Obje device 130 is generated in the UPnP network, and the counter Obje component 150 and the Obje client 140 are generated in the Obje network.

Figure 2:
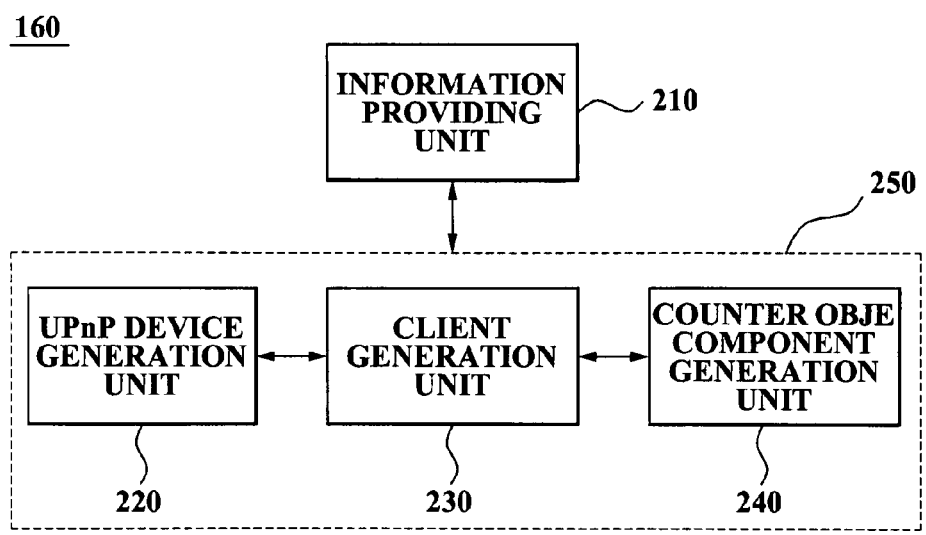
FIG. 2 is a block diagram illustrating an Obje network device service apparatus in a UPnP network system according to an exemplary embodiment of the present invention.

FIG. 2 is a block diagram illustrating an Obje network device service apparatus 160 in a UPnP network system according to an exemplary embodiment of the present invention.

Referring to FIG. 2, the Obje network device service apparatus 160 in the UPnP network system includes an information providing unit 210 and an Obje service generation unit 250.

The information providing unit 210 discovers an Obje device and provides information about the discovered OBJE device.

In this case, the information providing unit 210 may discover the Obje device which exists in an Obje network via an Obje discovery.

The Obje service generation unit 250 generates a UPnP device, a counter Obje component, and an Obje client, based on the information about the discovered Obje device. Also, the UPnP device may control the Obje client to use the discovered Obje device in a UPnP control point. In this case, the UPnP device corresponds to the Obje device, the counter Obje component has a data type of the Obje device, and the Obje client generates a session for data transmission between the Obje device and the counter Obje component.

The Obje service generation unit 250 includes a UPnP device generation unit 220, a client generation unit 230, and a counter Obje component generation unit 240.

The counter Obje component generation unit 240 generates the counter Obje component having the data type of the discovered Obje device, based on the information provided by the information providing unit 210.

Specifically, when the discovered Obje device is an Obje source component, the counter Obje component generation unit 240 generates an Obje sink component having a data type of the Obje source component. When the discovered Obje device is an Obje sink component, the counter Obje component generation unit 240 generates an Obje source component having a data type of the Obje sink component.

The client generation unit 230 generates the Obje client in the Obje network, based on the information about the discovered Obje device. The Obje client generates a session for the data transmission between the discovered Obje device and the counter Obje component.

In this case, the Obje client generated by the client generation unit 230 corresponds to the UPnP control point in the UPnP network.

The UPnP device generation unit 220 generates the UPnP device corresponding to the Obje device in the UPnP network, based on the information provided by the information providing unit 210.

In this case, when the UPnP device is generated by the UPnP device generation unit 220, the UPnP control point discovers the generated UPnP device via a UPnP discovery. Also, the UPnP control point may control the generated UPnP device by requesting from the generated UPnP device a description and receiving the description.

In this case, the UPnP device controls the Obje client to generate the session for data transmission between the Obje device and the counter Obje component, when a control command of the UPnP control point is input into the UPnP device.

Specifically, when a control command is input into the UPnP control point to the generated UPnP device, the UPnP device controls the Obje client in order to perform an operation corresponding to the control command via the Obje device. The Obje client generates the session for data transmission between the discovered Obje device and the counter Obje component. The Obje source component directly transmits a content and a mobile code which is necessary for managing the content, to the Obje sink component. Accordingly, interoperability between devices in the Obje network may be obtained.

Figure 3:
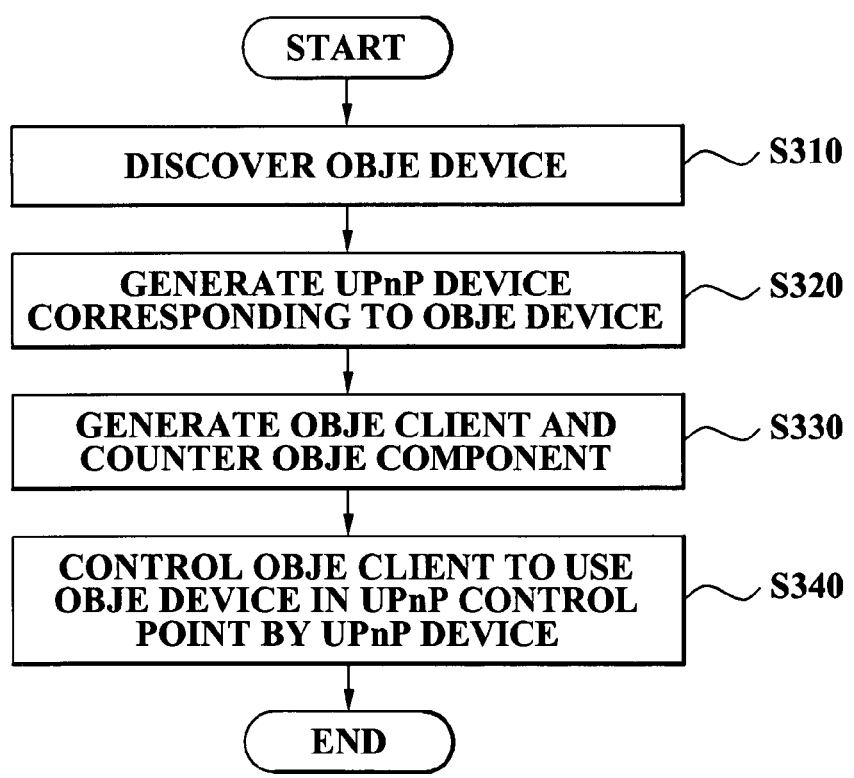
FIG. 3 is a flowchart illustrating an operation of an Obje network device service method in a UPnP network system according to an exemplary embodiment of the present invention.

FIG. 3 is a flowchart illustrating an operation of an Obje network device service method in a UPnP network system according to an exemplary embodiment of the present invention.

Referring to FIG. 3, in the Obje network device service method, in operation S310, an Obje device in an Obje network is discovered, and information about the discovered Obje device is provided.

In this case, the Obje device may be discovered via an Obje discovery.

In operation S320, a UPnP device corresponding to the Obje device is generated in a UPnP network, based on the information about the Obje device.

In this case, the generated UPnP device may be discovered in a UPnP control point via a UPnP discovery.

Also, in operation S330, a counter Obje component and an Obje client are generated in an Obje network, based on the information about the Obje device. Specifically, the Obje device may be operated in the Obje network by generating the counter Obje component and the Obje client.

In this case, the generated Obje client corresponds to the UPnP control point in the UPnP network.

In this case, when the discovered Obje device is an Obje source component, the generated counter Obje component may be an Obje sink component. When the discovered Obje device is the Obje sink component, the generated counter Obje component may be the Obje source component.

Although it is illustrated that operation 320 and operation 330 described above are sequentially performed in FIG. 3, operation 330 may be performed prior to operation 320, and operation 320 and operation 330 may be simultaneously performed.

In operation S340, the generated Obje client is controlled to use the discovered Obje device in the UPnP control point, which exists in the UPnP network, by the generated UPnP device.

Specifically, the UPnP control point requests the UPnP device for a description, and receives the description. Also, when a control command of the UPnP control point is input in the UPnP device, the UPnP device controls the Obje client to generate a session for data transmission between the Obje device and the counter Obje component. Accordingly, the Obje device may be used in the UPnP control point.

Figure 4:
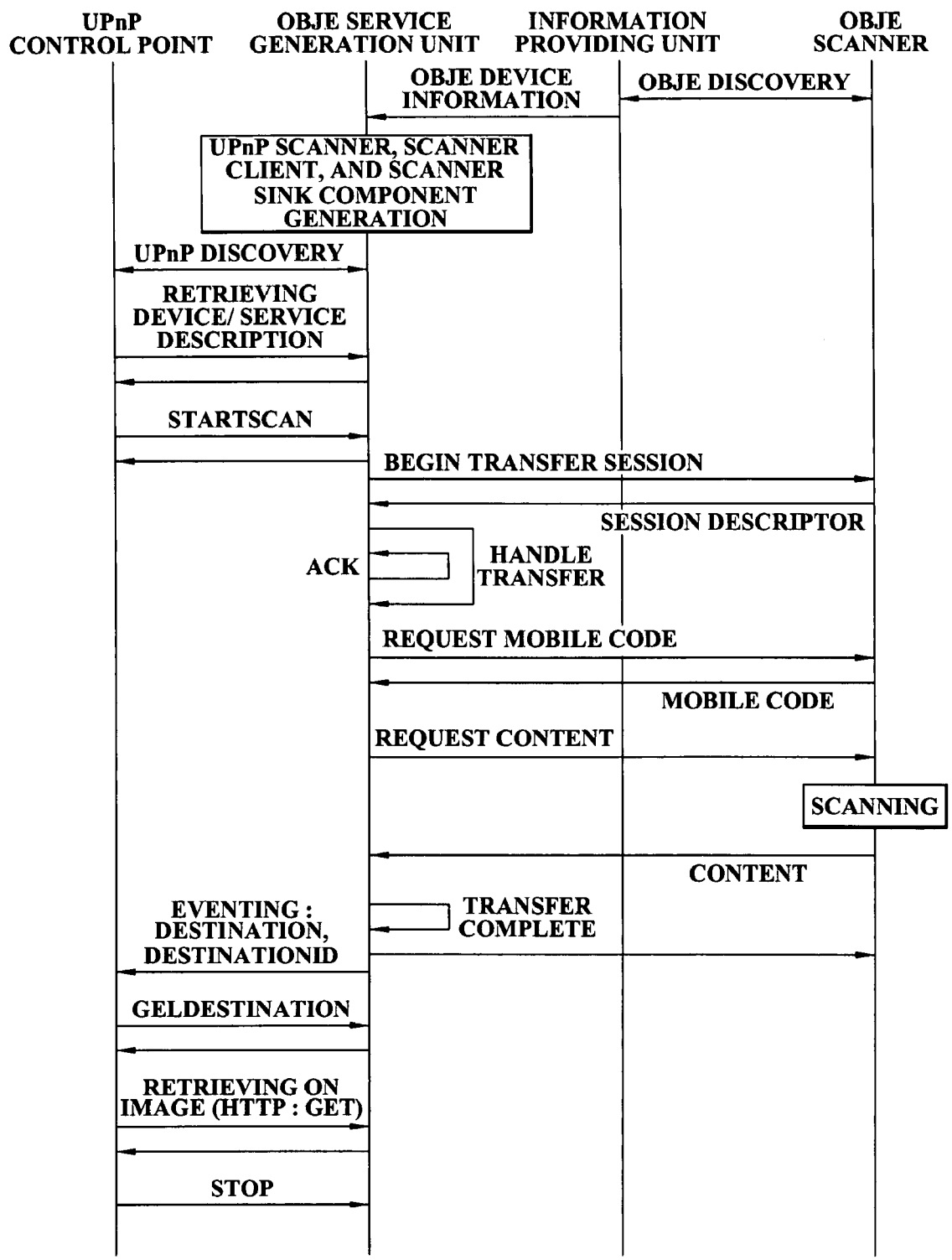
FIG. 4 is a flowchart illustrating an operation of controlling an Obje scanner in a UPnP control point according to an exemplary embodiment of the present invention.

FIG. 4 is a flowchart illustrating an operation of controlling an Obje scanner in a UPnP control point according to an exemplary embodiment of the present invention.

Referring to FIG. 4, an information providing unit discovers the Obje scanner in an Obje network via an Obje discovery. The information providing unit transmits information about the discovered Obje scanner to an Obje service generation unit.

The Obje service generation unit generates a UPnP scanner, a scanner client and a scanner sink component, based on the information about the Obje scanner. The scanner sink component has a data type of the Obje scanner, i.e., a source component.

The UPnP control point discovers the UPnP scanner via a UPnP discovery, requests from the UPnP scanner a description information, and receives the description information.

The UPnP control point transmits a StartScan command to the UPnP scanner by using the description information of the UPnP scanner.

The Obje service generation unit receives the StartScan command, and generates a transfer session between the scanner sink component and the Obje scanner by using the scanner client. When requesting from the Obje scanner a mobile code which is necessary for transmitting and managing an image, and receiving the mobile code, the scanner sink component requests from the Obje scanner a content transmission. The Obje scanner, which receives the request for the content transmission from the scanner sink component, performs scanning. After completing the scanning, the Obje scanner transmits an image, which is obtained by the scanning, to the scanner sink component.

After completing the receiving of the image, the scanner sink component reports the completion of receiving of the image to the scanner client and the Obje scanner. Also, the UPnP scanner reports the completion of the receiving of the image to the UPnP control point by using a UPnP eventing.

The UPnP control point receives the image which is scanned from the UPnP scanner, and may obtain the scanned image.

Through the operations described above, the image, which is scanned by the Obje scanner, i.e., the Obje device, may be obtained in the UPnP control point.

Figure 5:
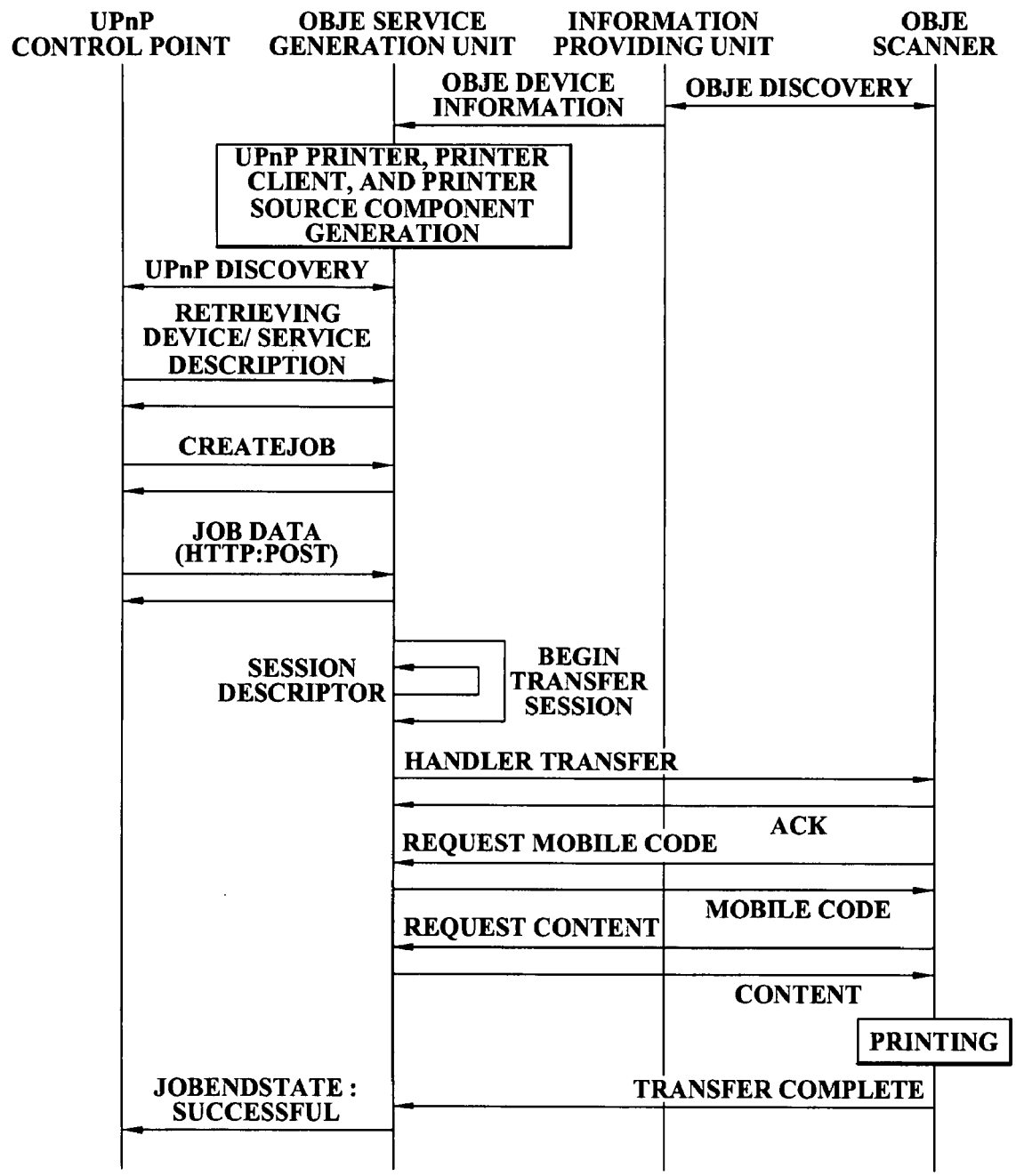
FIG. 5 is a flowchart illustrating an operation of controlling an Obje printer in a UPnP control point according to an exemplary embodiment of the present invention.

FIG. 5 is a flowchart illustrating an operation of controlling an Obje printer in a UPnP control point according to an exemplary embodiment of the present invention.

Referring to FIG. 5, an information providing unit discovers the Obje printer in an Obje network via an Obje discovery, and transmits information about the Obje printer to an Obje service generation unit.

The Obje service generation unit discovers the Obje printer in an Obje network via an Obje discovery. Also, the information providing unit transmits the information about the discovered Obje printer to an Obje service generation unit.

The Obje service generation unit generates a UPnP printer, a printer client, and a printer source component, based on the information about the Obje printer. The printer source component has a data type of the Obje printer, i.e., a sink component.

The UPnP control point discovers the UPnP printer via a UPnP discovery, requests description information from the UPnP printer, and receives the description information.

The UPnP control point transmits a CreateJob command to the UPnP printer by using the description information of the UPnP printer. Also, the UPnP control point transmits contents such as an image to be printed, i.e. Job data, to the UPnP printer.

The Obje service generation unit receives the CreateJob command and the content, and generates a transfer session between the printer source component and the Obje printer by using the printer client.

The Obje printer requests the printer source component for a mobile code, which is necessary for transmitting and managing the content, and receives the mobile code. Also, the Obje printer requests the printer source component for a content transmission.

After completing the receiving of the contents, the Obje printer performs printing. After completing the printing, the Obje printer reports the completion of the receiving of the contents to the printer client and the printer source component.

The UPnP printer of the Obje service generation unit receives a print completion message, and reports the UPnP control point that a request for the printing is successfully completed.

Through the above described operations, the content may be printed by using the Obje printer, i.e., the Obje device, in the UPnP control point.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, an Obje network device service apparatus and method in a UPnP network system may use an Obje device in the UPnP network system.

Also, according to the present invention, an Obje network device service apparatus and method in a UPnP network system generates a UPnP device corresponding to an Obje device, a counter Obje component, and an Obje client, and thereby may use the Obje device in a UPnP control point included in a UPnP network.

Also, according to the present invention, in an Obje network device service apparatus and method in a UPnP network system, a UPnP control point may use an Obje device as a UPnP device.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An Obje network device service apparatus that controls an Obje object of an Obje network in a Universal Plug and Play (UPnP) network system that includes a UPnP network and the Obje network, the apparatus comprising:
   an Obje service generation unit; and
   an information providing unit which discovers the Obje device in the Obje network, and provides information about the Obje device to the Obje service generation unit;
   wherein the Obje service generation unit generates a UPnP device, in the UPnP network, that corresponds to the Obje device, a counter Obje component, in the Obje network, that comprises a data type of the Obje device, and an Obje client, in the Obje network, that generates a session for data transmission between the Obje device and the counter Obje component, based on the information about the Obje device, and
   wherein the UPnP device controls the Obje client to control the Obje device based on a command received from a UPnP control point, in the UPnP network, that discovers the UPnP device.

2. The apparatus of claim 1, wherein the Obje service generation unit comprises:
   a UPnP device generation unit which generates the UPnP device;
   a counter Obje component generation unit which generates the counter Obje component; and
   a client generation unit which generates the session for data transmission between the Obje device and the counter Obje component.

3. The apparatus of claim 2, wherein the counter Obje component generation unit generates an Obje sink component having a data type of an Obje source component if the Obje device is the Obje source component, and generates an Obje source component having a data type of an Obje sink component if the Obje device is the Obje sink component.

4. The apparatus of claim 2, wherein the UPnP device controls the Obje client to generate the data transmission between the Obje device and the counter Obje component, when a control command of the UPnP control point is input into the UPnP device.

5. The apparatus of claim 1, wherein the information providing unit discovers the Obje device via an Obje discovery.

6. The apparatus of claim 3, wherein the Obje source component directly transmits a content and a mobile code for managing the content to the Obje sink component.

7. An Obje network device service method of controlling an Obje object of an Obje network in a Universal Plug and Play (UPnP) network system that includes a UPnP network and the Obje network, the method comprising:
   discovering the Obje device in the Obje network, and providing information about the Obje device; and
   generating a UPnP device, in the UPnP network, that corresponds to the Obje device, a counter Obje component, in the Obje network, that comprises a data type of the Obje device, and an Obje client, in the Obje network, that generates a session for data transmission between the Obje device and the counter Obje component, based on the information about the Obje device, wherein the UPnP device controls the Obje client to control the Obje device based on a command received from a UPnP control point, in the UPnP network, that discovers the UPnP device.

8. The method of claim 7, wherein the generating of the UPnP device, the counter Obje component, and the Obje client comprises:

generating, by a UPnP device generation unit, the UPnP device corresponding to the Obje device;

generating, by a counter Obje component generation unit, the counter Obje component having the data type of the Obje device;

generating, by a client generation unit, the Obje client which generates the session for data transmission between the Obje device and the counter Obje component; and controlling the Obje client to use the Obje device in the UPnP control point, by the UPnP device.

9. The method of claim 8, wherein the generating of the counter Obje component generates an Obje sink component having a data type of an Obje source component if the discovered Obje device is the Obje source component, and generates the Obje source component having a data type of the Obje sink component if the discovered Obje device is the Obje sink component.

10. The method of claim 8, wherein the controlling of the Obje client controls the Obje client to generate the data transmission between the Obje device and the counter Obje component by the UPnP device, if a control command of the UPnP control point is input into the UPnP device.

11. The method of claim 7, wherein the discovering of the Obje device discovers the Obje device via an Obje discovery.

12. A computer-readable recording medium storing a program for implementing an Obje network device service method of controlling an Obje object of an Obje network in a Universal Plug and Play (UPnP) network system that includes a UPnP network and the Obje network, the method comprising:

discovering the Obje device in the Obje network, and providing information about the Obje device; and generating a UPnP device, in the UPnP network, that corresponds to the Obje device, a counter Obje component, in the Obje network, that comprises a data type of the Obje device, and an Obje client, in the Obje network, that generates a session for data transmission between the Obje device and the counter Obje component, based on the information about the Obje device, wherein the UPnP device controls the Obje client to control the Obje device based on a command received from a UPnP control point, in the UPnP network, that discovers the UPnP device.

13. An Obje network device service method of controlling an Obje object of an Obje network in a Universal Plug and Play (UPnP) network system that includes a UPnP network and the Obje network, the method comprising:

discovering the Obje device in the Obje network;

providing information about the discovered Obje device;

generating a UPnP device, in the UPnP network, that corresponds to the Obje device; and generating an Obje client, in the Obje network, that controls the Obje device; and controlling by the UPnP device in response to a command received from a UPnP control point, in the UPnP network, that discovers the UPnP device, the Obje client to control the Obje device, based on the command.

14. The Obje network device service method according to claim 13, further comprising generating a counter Obje component having a data type of the Obje device.

15. The Obje network device service method according to claim 14, wherein the Obje client generates a session for data transmission between the Obje device and the counter Obje component.

* * * * *